(12) United States Patent
Germann et al.

(10) Patent No.: US 8,700,546 B2
(45) Date of Patent: Apr. 15, 2014

(54) MODEL BASED CALIBRATION OF INFERENTIAL SENSING

(75) Inventors: David Germann, North Vancouver (CA); Gregory E. Stewart, North Vancouver (CA); Daniel Pachner, Prague (CZ)

(73) Assignee: Honeywell International Inc., Morristown, NJ (US)

( * ) Notice: Subject to any disclaimer, the term of this patent is extended or adjusted under 35 U.S.C. 154(b) by 273 days.

(21) Appl. No.: 13/331,812

(22) Filed: Dec. 20, 2011

(65) Prior Publication Data

US 2013/0159225 A1    Jun. 20, 2013

(51) Int. Cl.
G06F 15/18 (2006.01)

(52) U.S. Cl.
USPC .......................................................... 706/12

(58) Field of Classification Search
None
See application file for complete search history.

(56) References Cited

U.S. PATENT DOCUMENTS

2003/0033127 A1* 2/2003 Lett ................................ 703/11
2008/0013825 A1* 1/2008 Nagatsuka et al. ........... 382/153

OTHER PUBLICATIONS

Wu et al. "A Novel Approach to Calibrate a Structured Light Vision Sensor in a Robot Based 3D Measurement System", Proc. ICMIC, 2010, pp. 298-303.*

* cited by examiner

*Primary Examiner* — Li-Wu Chang
(74) *Attorney, Agent, or Firm* — Schwegman Lundberg & Woessner, P.A.

(57) ABSTRACT

An inferential sensor module is incorporated into an engine simulation model. One or more parameters for the inferential sensor module are calibrated using one or more of engine measurement data and the engine simulation model. The calibration is performed such that a difference between an inferred signal predicted by the inferential sensor module and a signal measured on an engine is minimized. The inferential sensor module and the one or more calibrated parameters are loaded into an engine control unit in order to predict inferred variables.

17 Claims, 4 Drawing Sheets

MODEL BASED CALIBRATION OF INFERENTIAL SENSING

TECHNICAL FIELD

The present disclosure relates to inferential sensing, and in an embodiment, but not by way of limitation, model-based calibration of inferential sensing.

BACKGROUND

In diesel engine and other applications, very often control designers desire to create "inferential sensor" signals. These are signals in which a variable that is difficult or expensive to measure directly is inferred by combining the information received from one or more sensors, each measuring a different property. This set of sensor signals is input to an algorithm from which the desired quantity is inferred. A problem faced by the designer of inferential sensors is that they require significant engineering time and test cell measurements in order to calibrate the algorithms to achieve sufficient accuracy.

This process is illustrated in graphic form in FIG. 1, wherein engine control unit (ECU) calibration personnel determine values of the calibration parameter ($\Theta$ in FIG. 1) such that the inferred value (Z in FIG. 1) is sufficiently accurate. In using the process of FIG. 1, in many cases, the calibration of inferential sensing algorithms is achieved by manual manipulation of the calibration parameter, that is, manipulating the numerical values of theta ($\Theta$) until an acceptable performance is observed. This manual or semi-manual process requires a significant amount of expensive engineering and engine test cell time.

Specifically, to accomplish this, an engineer equips an engine with a set of sensors and makes the signals of these sensors (y in FIG. 1) available to an engine control unit. The engineer further equips the engine to measure a desired engine output or variable ($z_{meas}$) using a sensor (which may be expensive, complex, not too robust, and/or not too accurate). The engineer then measures the variables y and $z_{meas}$ at several operating points of the engine. As noted, manual or semi-manual techniques are used to calculate the numerical values for theta such that the modeled function z=f(y, theta) is close to the measured values ($z_{meas}$). Put another way, the norm of the difference between the estimated z and the measured $z_{meas}$ is minimized. This process is then difference between the desired z and measured z is minimized.

Because this is a painstaking, time consuming, less than accurate, and expensive process, designers often "live with" substandard calibration, or spend significant costs on obtaining the desired accuracy.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, electrical, and optical changes may be made without departing from the scope of the present invention. The following description of example embodiments is, therefore, not to be taken in a limited sense, and the scope of the present invention is defined by the appended claims.

One or more embodiments address the problems associated with manual and/or semi-manual calibration of inferential sensing by leveraging a technology that includes a functionality to automatically calibrate a medium-fidelity, grey box, control-oriented model (COM) of turbocharged engines and after treatment systems. Specifically, in an embodiment, an engineer can leverage a COM for calibrating inferential sensing algorithms (that is, the numerical value of theta). The COM can be a general medium fidelity model of an engine. As is known in the art, the COM contains a set of nonlinear ordinary differential equations, and it is able to produce a wide variety of output signals from the engine such as pressures, flows, temperatures, and gas compositions. As is further known in the art, the equations in a particular COM depend on several factors, including the engine being used. While such a COM is too complex to be run in an engine control unit, its output can be leveraged to calibrate the simpler structure of the inferential sensing algorithm (z=f(y, theta)).

Starting in an offline environment (i.e., not within an ECU), an engineer selects an engine simulation model (FIG. 2, No. 220) that is suited for his or her particular application. This model is normally based on physical first principles, but this is not an absolute necessity. The engine simulation model is used to predict a variety of engine properties (e.g., pressures, temperatures, flows, and gas composition). In an embodiment, the engine simulation model is calibrated to on-engine data containing model inputs signals (e.g., actuator positions, injection quantities, and ambient conditions) and measurements of a various engine properties.

Figure 1:
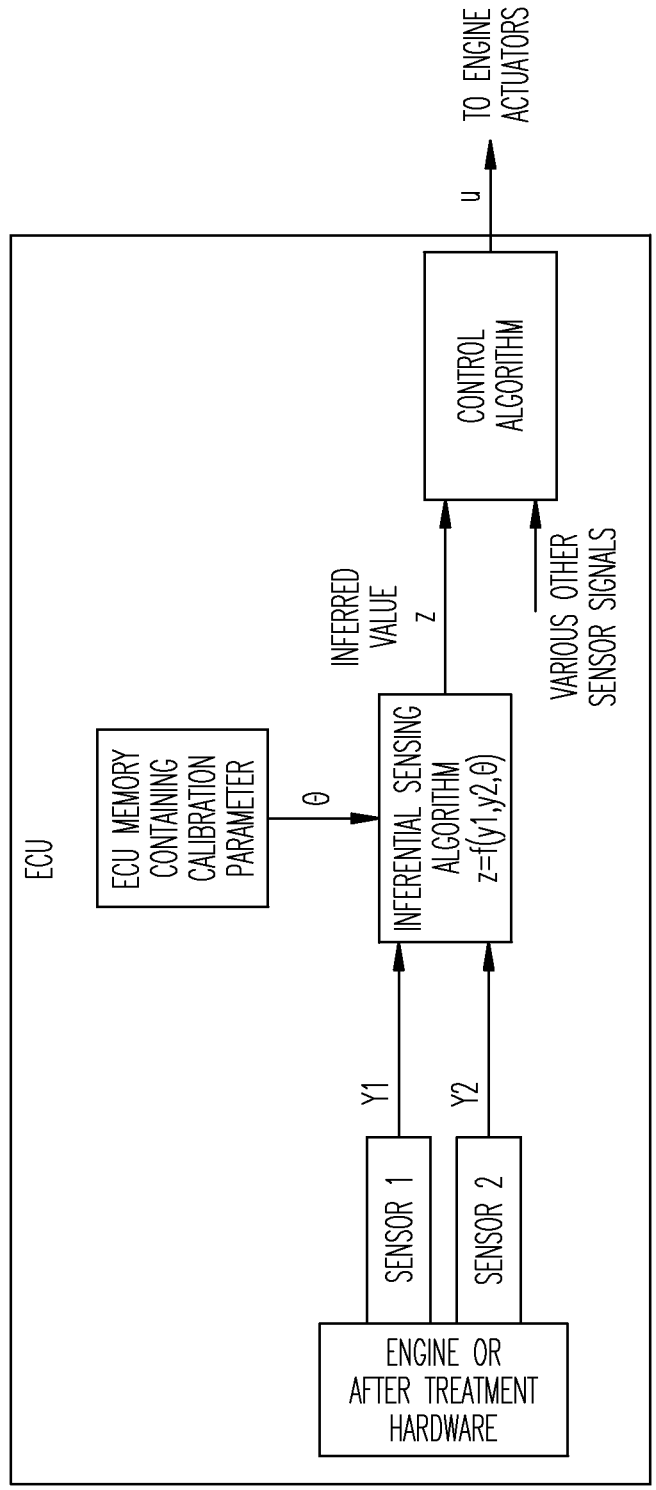
FIG. 1 is a block diagram illustrating the use of and inferential sensing algorithm and calibration parameters to infer a value in an engine system.
Figure 2:
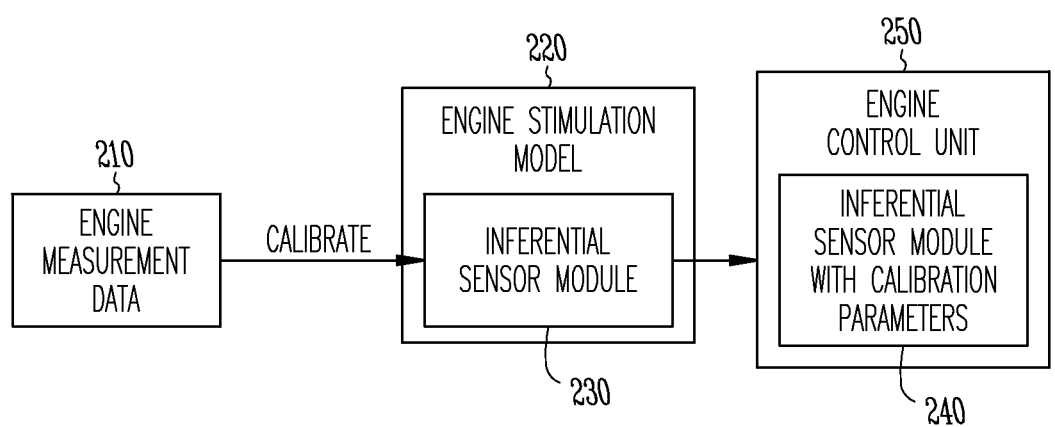
FIG. 2 is a block diagram illustrating an inferential sensor module incorporated into an engine control unit, wherein the inferential sensor module includes parameters that were calibrated using an engine simulation model.

Either during or after calibration of the engine simulation model, an inferential sensing module or algorithm is incorporated or embedded into the engine simulation model (FIG. 2, No. 230). Engine measurement data (FIG. 2, No. 210) contains model input signals (actuator position, injection quantity, ambient conditions, etc.). The engine measurement data are likely measured by test cell equipment, but also production sensors (offline, procedure of calibrating the ISA). The engine data include measurements of all inputs to the model and ISA, the inferred value(s), and possibly other signals which are predicted by the model. Using the engine data and the engine model containing the ISA, the calibration parameters of the ISA are calibrated such that the difference of the inferred signal predicted by the ISA and the one measured in the data is minimized.

The calibrated inferential sensing module (specifically the calibration parameter $\Theta$) is placed into an engine control unit (FIG. 2, Nos. 240, 250). The engine control unit containing the inferential sensing module can infer engine properties that are not directly measured on the production engine by using a set of on-engine measurements (e.g. pressures, temperatures, flows, and gas composition). The inferred signal can be of various types, e.g. pressure, temperature or likely even non-physical signals, or useful functions thereof such as an EGR fraction or a fraction of inert gases in the intake. The inferential sensing module in the engine control unit includes the calibration parameters that were computed as a function of measured or modeled engine data.

Regarding the calibration of the inferential sensor module, the inferential module (f(y,θ)) is integrated into overall engine simulation model. Then, the calibration of the engine simulation model is leveraged to calibrate the inferential sensor module, that is, to determine θ. Thereafter, the numerical values of θ are extracted from the COM and written to the ECU. This approach of using an engine simulation model and an inferential sensor module is systematic and optimal, and it works even if certain input signals (y) of algorithm (f) are not available. This cannot be said of the conventional manual and/or semi-manual approaches. Additionally, this approach is flexible for various inferential sensor structures whereas the calibration of the conventional approaches has to be modified for each case.

The advantages of the current approach, and the shortcomings of the manual/semi-manual approach, can be explained further. The inputs y to the inferential sensor algorithm are theoretical (ideal) values which sometimes cannot be measured ideally. For example, temperatures cannot be usually measured without a small delay, typically a few seconds. This delay deteriorates the inferential sensor accuracy during transients. Also, it is hard to ensure the temperature measurement will not be affected by parasitic heat transfers to/from other locations. Additionally, flows often cannot be measured exactly at places where they should be measured. For example, it is hardly possible to measure the air flow into cylinders. However, it is possible to measure flow of the air to the intake manifold from which the air is supplied to the cylinders. This measurement can substitute for the former. Again, there is a systematic error during transients, when the pressure in the intake manifold is changing quickly. Moreover, concentration meters are complicated devices where chemical reactions often take place. The dynamics of the measurements is often slow, temperature dependent, and may be affected by compounds other than those desired to be measured. Time response of the accurate gas analyzers may be tens of seconds. Faster analyzers may be less accurate. Also, it is difficult to measure some of the flows with sufficient accuracy. However, the pressures can be measured relatively easily with sufficient accuracy. The flow through an orifice may be inferred from the inlet and outlet pressures and the temperature.

The examples of the previous paragraph show that in the equation $z=f(y, \theta)$, some of the data z and y are actually not available or not ideal. However, they are usually substituted with measurements which are close. For example, as noted, flow to cylinders is replaced by the flow into the intake manifold, gas temperature is replaced by thermometer temperature, and concentration in the cylinder is replaced by concentration in the tailpipe. Furthermore, some of the y's could actually be replaced by another inferential mechanism like pressures, temperatures, or flow calculations.

However, these problems or concerns are adequately addressed by the approach of the current disclosure. In the engine simulation model or COM, all variables are available, including those which can hardly be measured. When calibrating the model fitting the measurements, all the information available in the measurements is utilized. Then, model-predicted flow is in fact calibrated by both flow measurements and the pressures/temperature measurements. Thus, the previously mentioned problems of data availability and accuracy issues are mitigated. Utilizing all measurements for model calibration and making model based predictions of y exact values (not replacing them with close substitutes) solves both the availability and accuracy issues. The accuracy of the new approach is better, especially during transients because of the more accurate value for y (not systematically delayed).

In summary, the engine simulation model and inferential sensing module approach use model derived quantities regardless of whether meters are available and regardless of whether the meters are fast enough during transients. The model/module approach makes use of all measurements. Therefore, it is not necessary to decide whether the flow y will be derived from the pressure and/or temperature, or whether the sensor will be used. They can all be used. Lastly, the novel approach does not augment the equation $z=f(y, \theta)$ with other parameters to reconstruct some quantities. Rather, it uses the model for this purpose. In the novel approach the empirical part is delimited to the minimum, i.e. $z=f(y, \theta)$. It is not augmented with more empirical equations because the first principles based model is used.

Figure 3A:
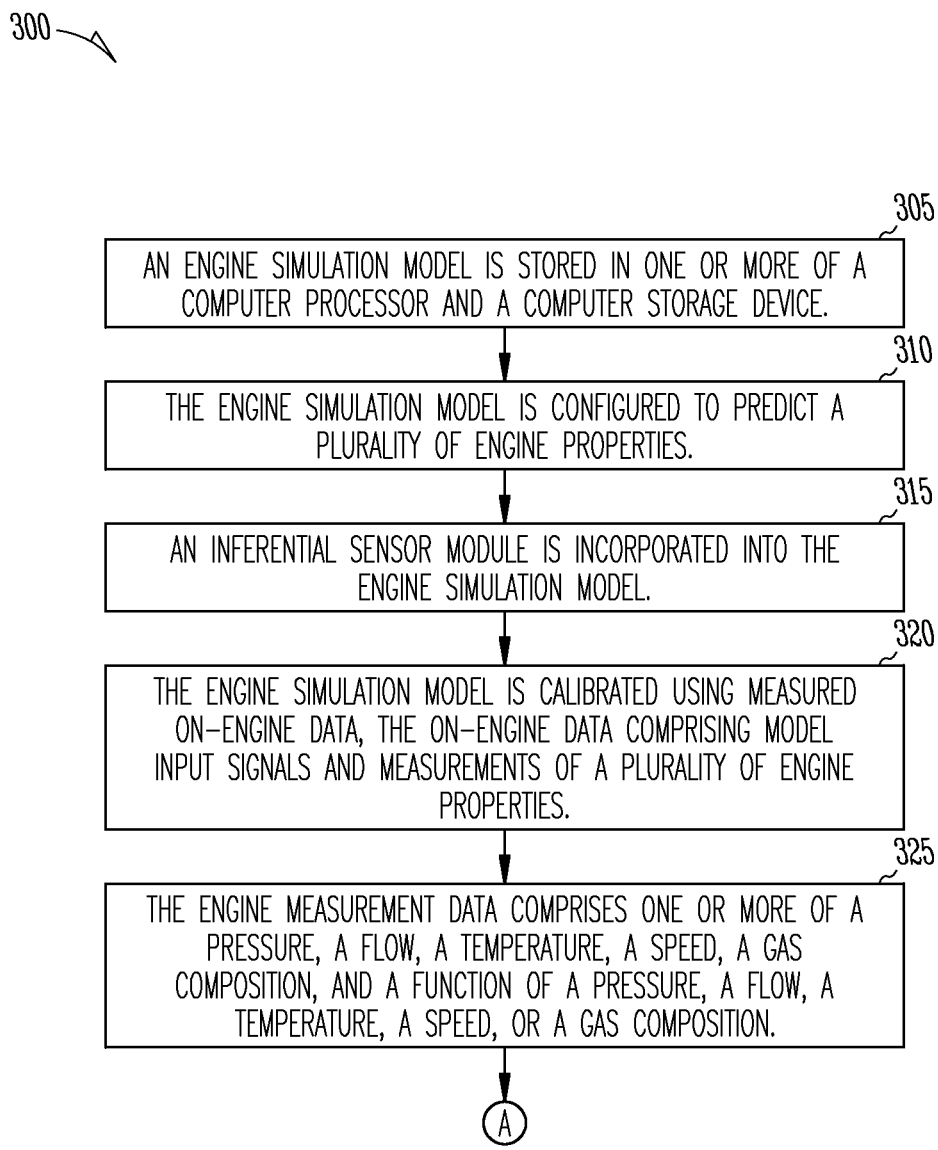
FIGS. 3A and 3B are a diagram illustrating an embodiment of a process to calibrate an inferential sensor using an engine simulation model.
Figure 3B:
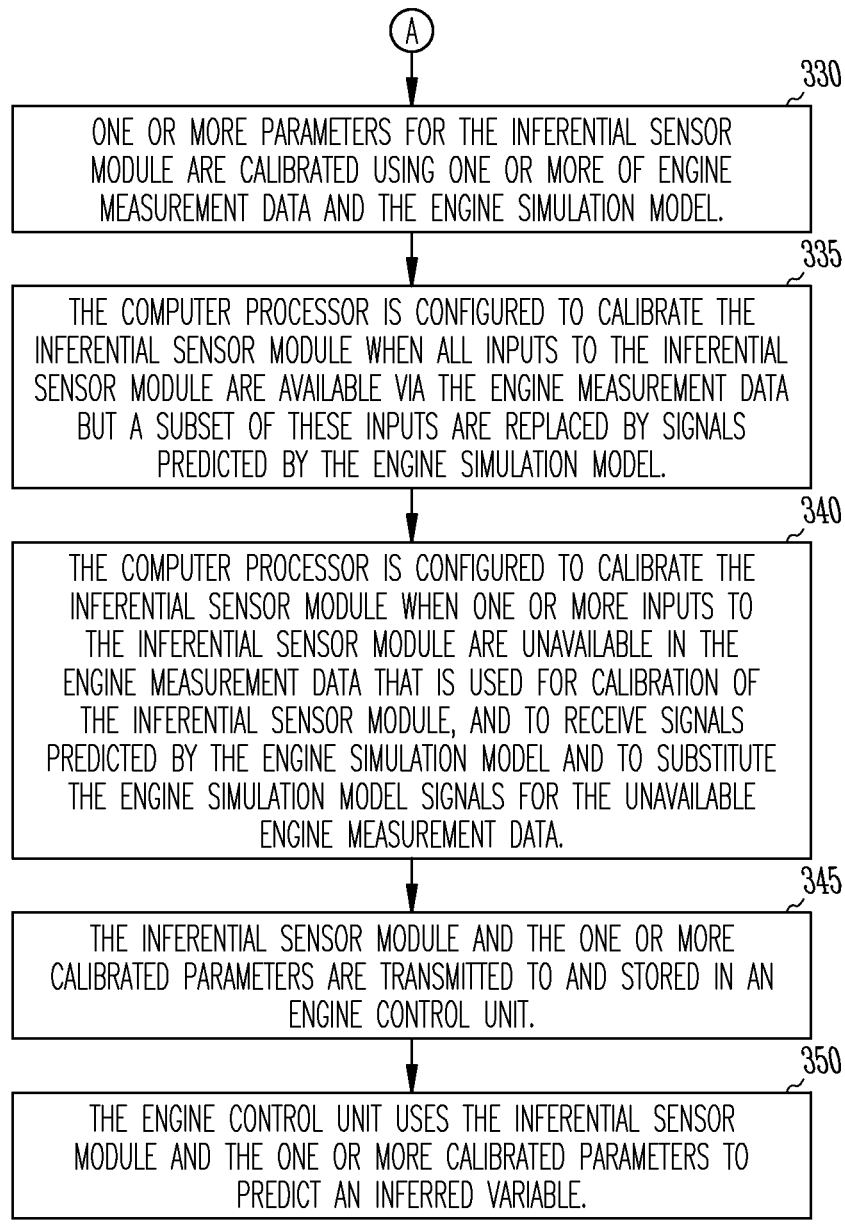

FIGS. 3A and 3B are a flowchart of an example process 300 for calibrating an inferential sensor using an engine simulation model. FIGS. 3A and 3B include a number of process blocks 305-350. Though arranged serially in the example of FIGS. 3A and 3B, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring to FIGS. 3A and 3B, at 305, an engine simulation model is stored in one or more of a computer processor and a computer storage device. At 310, the engine simulation model is configured to predict a plurality of engine properties. At 315, an inferential sensor module is incorporated into the engine simulation model. At 320, the engine simulation model is calibrated using measured on-engine data, the on-engine data comprising model input signals and measurements of a plurality of engine properties. At 325, the engine measurement data comprises one or more of a pressure, a flow, a temperature, a speed, a gas composition, and a function of a pressure, a flow, a temperature, a speed, or a gas composition. At 330, one or more parameters for the inferential sensor module are calibrated using one or more of engine measurement data and the engine simulation model. The parameters are calibrated such that a difference between an inferred signal predicted by the inferential sensor module and a signal measured on an engine is minimized. At 335, the computer processor is configured to calibrate the inferential sensor module when all inputs to the inferential sensor module are available via the engine measurement data but a subset of these inputs are replaced by signals predicted by the engine simulation model. At 340, the computer processor is configured to calibrate the inferential sensor module when one or more inputs to the inferential sensor module are unavailable in the engine measurement data that is used for calibration of the inferential sensor module, and to receive signals predicted by the engine simulation model and to substitute the engine simulation model signals for the unavailable engine measurement data. At 345, the inferential sensor module and the one or more calibrated parameters are transmitted to and stored in an engine control unit. At 350, the engine control unit uses the inferential sensor module and the one or more calibrated parameters to predict an inferred variable.

It should be understood that there exist implementations of other variations and modifications of the invention and its various aspects, as may be readily apparent, for example, to those of ordinary skill in the art, and that the invention is not limited by specific embodiments described herein. Features and embodiments described above may be combined with each other in different combinations. It is therefore contemplated to cover any and all modifications, variations, combinations or equivalents that fall within the scope of the present invention.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A system comprising:
one or more of a computer processor and a computer storage device configured to:
store an engine simulation model of an engine;
incorporate an inferential sensor module into the engine simulation model; and
calibrate one or more parameters for the inferential sensor module using one or more of engine measurement data and the engine simulation model, such that a difference between an inferred signal predicted by the inferential sensor module and a signal measured on the engine is minimized;
wherein the engine simulation model is calibrated using measured on-engine data, the on-engine data comprising model input signals and measurements of a plurality of engine properties.

2. The system of claim 1, comprising an engine control unit comprising the inferential sensor module and the one or more calibrated parameters.

3. The system of claim 1, wherein the engine simulation model is configured to predict a plurality of engine properties.

4. The system of claim 1, wherein the engine measurement data comprises one or more of a pressure, a flow, a temperature, a speed, a gas composition, and a function of a pressure, a flow, a temperature, a speed, or a gas composition.

5. The system of claim 1, wherein the computer processor is configured to calibrate the inferential sensor module when all inputs to the inferential sensor module are available via the engine measurement data but a subset of these inputs are replaced by signals predicted by the engine simulation model.

6. The system of claim 1, wherein the computer processor is configured to calibrate the inferential sensor module when one or more inputs to the inferential sensor module are unavailable in the engine measurement data that is used for calibration of the inferential sensor module, and to receive signals predicted by the engine simulation model and to substitute the engine simulation model signals for the unavailable engine measurement data.

7. A process comprising:
storing an engine simulation model into one or more of a computer processor and a computer storage device;
incorporating an inferential sensor module into the engine simulation model of an engine;
calibrating one or more parameters for the inferential sensor module using one or more of engine measurement data and the engine simulation model, such that a difference between an inferred signal predicted by the inferential sensor module and a signal measured on the engine is minimized; and
calibrating the engine simulation model using measured on-engine data, the on-engine data comprising model input signals and measurements of a plurality of engine properties.

8. The process of claim 7, comprising transmitting to an engine control unit the inferential sensor module and the one or more calibrated parameters.

9. The process of claim 7, wherein the engine simulation model comprises a control oriented model.

10. The process of claim 7, wherein the engine simulation model predicts a plurality of engine properties.

11. The process of claim 7, wherein the engine measurement data comprises one or more of a pressure, a flow, a temperature, a speed, a gas composition, and a function of a pressure, a flow, a temperature, a speed, or a gas composition.

12. The process of claim 7, comprising calibrating the inferential sensor module when all inputs to the inferential sensor module are available via the engine measurement data but a subset of these inputs are replaced by signals predicted by the engine simulation model.

13. The process of claim 7, comprising calibrating the inferential sensor module when one or more inputs to the inferential sensor module are unavailable in the engine measurement data that is used for calibration of the inferential sensor module, and receiving signals predicted by the engine simulation model and substituting the engine simulation model signals for the unavailable engine measurement data.

14. A non-transitory computer readable storage device comprising instructions that when executed by a processor execute a process comprising:
storing an engine simulation model into one or more of a computer processor and a computer storage device;
incorporating an inferential sensor module into the engine simulation model of an engine;
calibrating one or more parameters for the inferential sensor module using one or more of engine measurement data and the engine simulation model, such that a difference between an inferred signal predicted by the inferential sensor module and a signal measured on the engine is minimized; and
calibrating the engine simulation model using measured on-engine data, the on-engine data comprising model input signals and measurements of a plurality of engine properties.

15. The non-transitory computer readable storage device of claim 14, comprising instructions for transmitting to an engine control unit the inferential sensor module and the one or more calibrated parameters.

16. The non-transitory computer readable storage device of claim 14, wherein the engine simulation model comprises a control oriented model; and the engine simulation model predicts a plurality of engine properties.

17. The non-transitory computer readable storage medium of claim 14, wherein the engine control unit uses the inferential sensor module and the one or more calibrated parameters to predict an inferred variable.

* * * * *